April 8, 1958

C. D. BRANSON 2,829,835

THERMOSTATS

Filed Oct. 26, 1954

INVENTOR.
Charles D. Branson.
BY
Albert J. Henderson
HIS ATTORNEY

INVENTOR.
Charles D. Branson.

United States Patent Office 2,829,835
Patented Apr. 8, 1958

2,829,835

THERMOSTATS

Charles D. Branson, Knoxville, Tenn., assignor to Robertshaw-Fulton Controls Company, Greensburg, Pa., a corporation of Delaware Application October 26, 1954, Serial No. 464,849

3 Claims. (Cl. 236—34.5)

This invention relates to temperature regulators and more particularly to thermostatic control devices designed primarily for use in the cooling system of internal combustion engines.

It has been customary to provide thermostatic valves in the cooling systems of automobiles and truck engines for opening a passageway for a coolant which is circulated by a pump through a radiator when such coolant has reached a predetermined high temperature. In the past, the radiator associated with automobile and truck cooling systems has been relatively large, so as to provide a large radiating area for the coolant.

In recent years, however, the tendency of automobile manufacturers has been to decrease the size of the radiator and to increase the power output of the engine with a consequent greater need for coolant circulation. With the cooling capacity of the present-day engine radiator somewhat decreased and the increase of heat generated by a larger and more powerful engine, it has been necessary to install in the cooling system a more powerful water pump to effect a faster circulation in the cooling system to offset this lessened cooling ability of the system. This advent of more powerful pumps has reduced the effectiveness of the present-day internal combustion engine thermostat since the increase of pressure in the cooling system has a marked effect on the efficiency and life of the thermostat.

Heretofore, thermostats of this general character utilized a valve and bellows member as the valve actuating member, the bellows being charged with a suitable thermo-sensitive fluid which, when heated to a predetermined temperature, served to expand the bellows thereby offering a suitable force generating means for opening the valve member permitting the coolant to flow through the radiator.

Numerous disadvantages have been experienced in the use of a bellows actuating member for the present automobile engine. These bellows members were delicate and susceptible to vibration caused by the impact of instantaneous increase of coolant pressure resulting in deformation and puncture of the bellows. Furthermore, the bellows members were sensitive to exterior pressures which would somewhat deform the bellows configuration so as to vary the proper operating temperature at which the bellows is designed to open or close its related valve member.

Heretofore, the cooling systems of automobiles have utilized for the most part, valves of the poppet type or of the butterfly type. In the use of both types, it has been found that sudden pressure surges would cause these valves to "blow open" or "blow close," as the case may be, depending on whether these valves were unbalanced in the open or closed positions. Further, the simple delicate bellows actuating members of a size normally suited for automobile thermostats, were unable to generate enough force to prevent this effect of pressure surges and the poppet valves are more often than not free to follow the forces of these pressure changes with the possibility of eventual rupture of the bellows member. In addition, this undesired force on the bellows member would tend to strain the delicate parts which go to make up the member and were likely to disrupt the predetermined temperature sensitivity of the bellows member so that in the subsequent usage, the original setting of the thermostatic valve cannot be relied upon.

Another serious result of high pump pressures has been the loss of proper temperature regulation due to leakage between the valve member and its seat. This result has affected butterfly valves as well as poppet valves. As in the case of "blow down" or "blow open," the present-day valve actuating means is unable to retain the valve member in proper seating position on the valve seat with the consequent leakage between these parts. Since it is most desirable that the warm-up period of the engine be as rapid as possible, leakage past the valve, during the initial starting of the engine when the valve is closed and the pressure is greatest, will cause considerable delay before sufficient heat is obtained in the cooling system for proper engine efficiency and operation of a vehicle heater.

This invention is directed to thermostatic by-pass valve means which avoids the objections found in the present-day thermostatic control means. In accordance with the present invention, a more powerful force generating valve actuating member is provided and takes the form of the conventional pressure insensitive thermally sensitive element having a casing containing fusible material, such as wax, and a plunger reciprocably related thereto.

As is known in the art, volumetric changes in the fusible material caused by the various thermal conditions will move the plunger relative to the casing and in this invention is linked in a suitable way with a novel arrangement of a main valve member and a bypass valve member to open and close the same in accordance with predetermined minimum and maximum temperatures of the coolant. Means are provided for avoiding the "blow open" and "blow close" effects of instantaneous surges of pressure and to this end, its novel sleeve valve members are utilized to be perfectly balanced and insensitive to pressure. An important feature of the invention is the provision of a sealing device which occupies a position between the main sleeve valve member and the housing supporting the same and serves to reduce the leakage past the valve member to a minimum.

An object of the present invention is to insure proper control of the passage of coolant through and in an internal combustion engine using a pressure insensitive thermostatic actuating means.

Another object of the invention is to decrease the warm-up period for an internal combustion engine utilizing a novel arrangement of pressure insensitive sleeve valve members.

Another object of the present invention is to eliminate the difficulties of "blow open" and "blow close" conditions heretofore encountered in highly pressurized cooling systems of the present-day internal combustion engine.

Other objects and advantages will appear from the following specification taken in conjunction with the accompanying drawings wherein.

Figure 1:
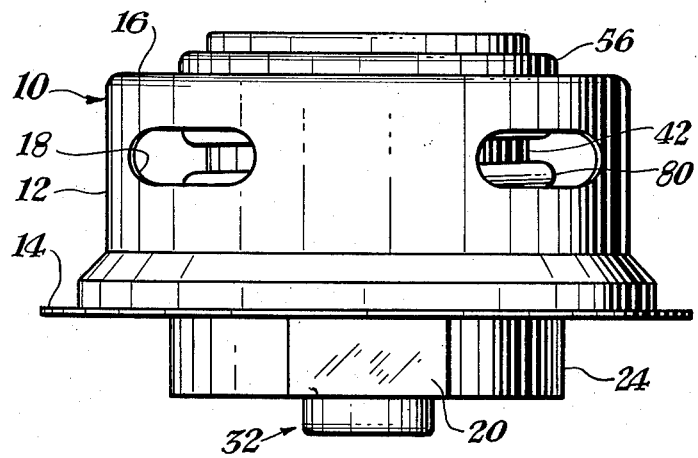
Fig. 1 is a front elevation of a control device embodying the invention.

Referring more particularly to the drawing, the temperature regulator support for this invention takes the form of an annular valve housing generally indicated by the reference numeral 10 having a cylindrical wall portion 12, an angular and radially extending flange 14 at one end thereof and an apertured wall plate 16. A plurality of bypass ports 18 are formed in the wall portion 12 for a purpose to be discussed hereinafter.

Depending from the housing 10 and attached thereto adjacent the plate 16, is a pair of diametrically opposite straps 20. Mounted on the lower portion of the straps 20 is a circular plate 22 having a peripheral flanged end 24 secured to the ends of the straps 20. The plate 22 also has a recessed central portion 26, a shoulder 28 contiguous to the recess 26 and an aperture 30 formed in the medial portion of the recess 26 and the plate 22 for the reception of a thermostatic actuating means generally indicated by the reference numeral 32. It is to be understood that the housing 10, the straps 20 and the plate 22 may all be formed from readily available sheet metal stock such as by stamping.

The thermostatic actuating device 32 is mounted interiorly of the housing 10 and concentric therewith. The device 32 is of a conventional form comprising a casing 34, a plunger 36 slidable therein and an expansible fusible material (not shown) disposed within the casing 34 in communication with a portion of the plunger 36. Any suitable fusible material which will give a large volumetric change on passing from the solid to the liquid state at a predetermined temperature may be used and since these devices are known in the art, further details and description are unnecessary. Suffice to say, that this rugged and compact unit when heated to a predetermined temperature is capable of imparting a positive, powerful force to the plunger 36 and is adapted to be manufactured easily and economically.

Figure 2:
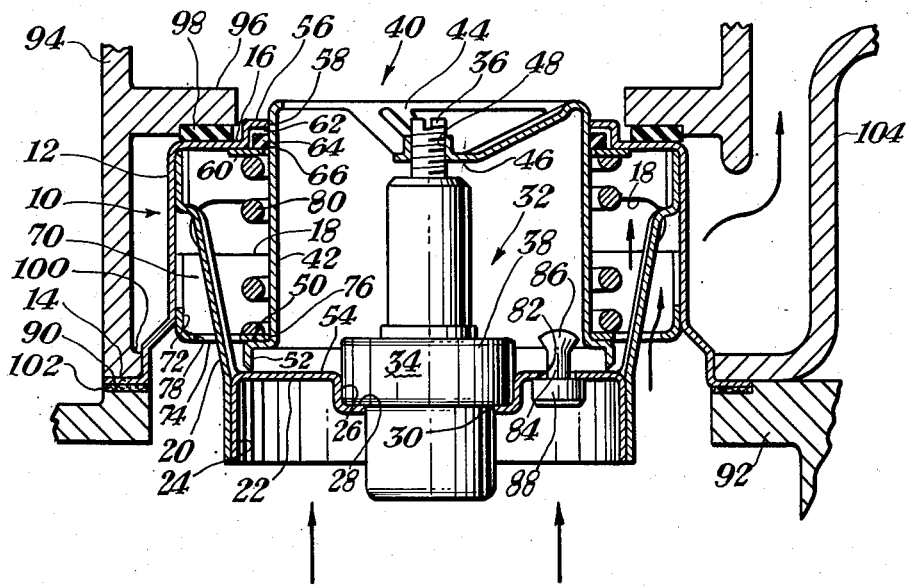
Fig. 2 is a longitudinal sectional view of the control device shown in Fig. 1 but positioned in the cooling system of an internal combustion engine with the valve members in one operative position.
Figure 3:
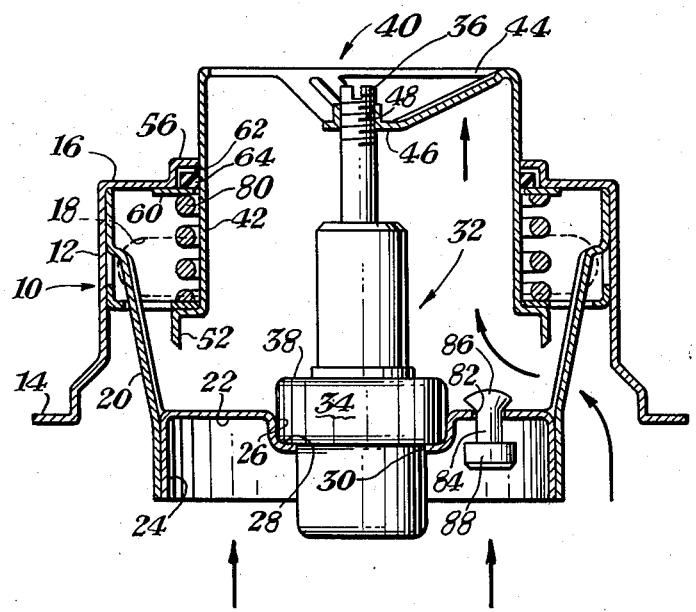
Fig. 3 is a sectional view similar to Fig. 2 but showing the parts in another operative position.

The casing portion 34 of the actuating device 32 extends through the aperture 30 and is secured to the plate 22 in a liquid-seal relation with respect to the inner edges of the aperture 30 by any suitable means. As shown in Figs. 2 and 3, shoulder 28 receives a collar portion 38 of the casing 34 and serves to firmly anchor the thermostatic device to the plate 22.

Slidable within the housing 10, and substantially concentric therewith is a main sleeve valve member indicated generally by the reference numeral 40 and preferably formed by stamping with a tubular member 42 and a radially extending perforated web structure 44 connected to and bridging the upper end of the tubular member 42. The web structure 44 converges axially to an apex disc 46 having a threaded bore 48 formed therein for threadedly receiving one end of the plunger 36. The other end of the tubular member 42 remote from the web structure 44 is formed with a shoulder 50 and a beveled edge 52. The interior surface 54 of the plate 22 provides a valve seat for the sleeve valve member 40 by cooperating with the beveled edge 52 thereon when the valve member 40 is in its most downward, or closed position as shown in Fig. 2.

As shown in Fig. 2, the top plate 16 of the housing 10 is formed with a circular offset portion 56 which provides an opening 58 for the reception of the sleeve valve member 40. An annular ring 60 is secured to the undersurface of the plate 16 adjacent the offset portion 56. The inner surfaces of the portion 56 and the ring 60 provide an annular recess 62 for the reception of a loosely retained circular sealing bushing 64. The inner edge 66 of the bushing 64 extends interiorly slightly beyond the inner edges of the ring 60 and the circular portion 56 and serves to loosely guide the sleeve valve member 40 during reciprocal movement thereof. The abutment of the inner edge 66 of the bushing 64 with the exterior surface of the tubular member 42 also serves to prevent leakage of coolant between the tubular member 42 and the wall portion 12 of the housing 10.

In operation, the bushing 64 offers very little resistance to the movement of the valve member 40 when there is no pressure differential across it. In addition, the bushing 64 will offer no seal between the housing 10 and the valve member 40 unless there is a pressure differential across the valve member 40. Also, the position of the valve member 40 or its direction of movement has little or no effect on the sealing properties of the bushing 64. However, during a pressure build-up of the cooling system, no matter how slight, the bushing 64 will be forced upwardly in the recess 62 toward the offset portion 56 and will also be forced inwardly toward the outer surface of the valve member 40 thereby providing an effective seal wherever a pressure differential exists across the valve member 40.

As previously mentioned the plunger 36 is threadedly secured in the aperture 48 formed in the medial portion of the apex disc 46, and is fixed in position after an initial adjustment thereof by any suitable holding means such as solder (not shown). From this, it will be obvious that with a change of state of the normally solid fusible material contained in the casing 34, the plunger 36 will move upwardly under the force generated by the expansible fusible material, and carry the valve member 40 with it from a closed position to an open position relative to the plate 22.

Slidably mounted on the tubular member 42 of the sleeve valve member 40 is a by pass sleeve valve member 70 shown as formed with a sleeve portion 72 conforming to the interior surface of the wall portion 12, a spider 74 extending from the sleeve 72 and being provided with an aperture 76 for loosely fitting around the exterior surface of the main sleeve valve member 40. Openings 78 are formed in the spider 74 for clearing the straps 20 during vertical movement of the member 70 and for the flow of cooling medium as indicated by the various arrows in Figs. 2 and 3. The coil spring 80 completely surrounds the main valve member 40 and is held in compression between the lower surface of the ring 60 and the upper surface of the spider 74. The spring 80 normally biases the bypass valve member 70 against the shoulder 50 of the main valve member 40 to be moved therewith and to bias the main valve member 40 against its valve seat 22.

An aperture 82 is formed in the circular plate 22 for receiving a "jiggle" pin 84 which is retained therein by means of a flattened flared portion 86 at one end of the pin 84 and a piston 88 at the other end thereof. In the position shown in Fig. 3, the pin 84 is suspended in the aperture 82 by the portion 86 and serves as a check valve to vent air that may otherwise be trapped in the cooling system below the housing 10. However, during the warm-up period of the cooling system when the pressure below the housing 10 is maximum or near maximum and the sleeve valve member 40 is in closed position, the pin 84, being subjected to the pressure, will occupy a position as shown in Fig. 2, such that the top surface of the piston 88 will bridge across the aperture 82 for preventing appreciable leakage of the coolant through the sleeve valve member 40 when the same is in closed position.

The valve housing 10 is adapted to be mounted over an opening 90 formed in the cylinder head of an internal combustion engine and communicating with a cooling passageway 92 in the cylinder head. The housing as shown in Fig. 2, is secured in place over the opening 90 by means of a hose connection outlet casting 94 suitably secured to the top of the cylinder head. The casting 94 is herein shown as having an annular wall portion 96 engaging the wall 16 of the housing 10 and sealed thereto as by a sealing gasket 98. Similarly the casting 94 is provided with an inwardly extending lower annular wall 100 engaging the flange 14 of the valve housing 10 which is sealed to the cylinder head as by a gasket 102. A bypass connection 104 is provided in the casting 94, to bypass the coolant past the radiator (not shown) when the sleeve valve member 40 is in closed position.

Operation

In the operation of the present invention, the housing 10 is positioned in the cooling system of an internal combustion engine so that the flow of coolant from the water pump is in the direction indicated by the various arrows. The main sleeve valve member 40 is shown in closed position indicative of the position when the temperature of the coolant is below the predetermined temperature at which circulation of the cooling system through the radiator portion of the cooling system is desired. Coolant will flow through the apertures 78, into the interior of the bypass valve member 70, through the apertures 18 and out into the bypass connection 104. Upon reaching the desired temperature, the fusible material in the casing 34, being located in the upstream side of the housing 10, will expand and since the plunger 36 is secured to the sleeve valve member 40, the member 40 will be forced upwardly against the bias of the spring 80. The bypass valve member 70 being attached to the lower portion of the main valve member 40 will be carried with the same and the beveled edge 52 of the main valve member 40 will be lifted from its seat on the plate 22. The raising of the bypass valve member 70 enables the sleeve portion 72 to slide over the apertures 18 thus closing off the flow of the coolant to the bypass connection 104. The stream of coolant will be permitted to flow between the beveled edge 52 and the plate 22, around the beveled edge 52, through the interior of the main valve member 40, through the apertures formed in the web structure 44 and into the radiating component of the cooling system. Conversely, upon cooling of the coolant below the desired predetermined temperature, the fusible material will solidify and contract permitting the spring 80 to force valve member 40 downwardly until the beveled edge 52 is seated upon the plate 22 thereby preventing the flow of coolant to the radiating component of the cooling system. In the meantime, the lowering of the valve member 40 under the bias of the spring 80 was accompanied by the lowering of the bypass valve member 70 and the opening of the apertures 18 for permitting the flow of coolant to the bypass connection 104.

It will therefore be apparent that by the present invention, a temperature regulator has been provided for an internal combustion engine which avoids "blow down" and "blow close" conditions by the provision of a suitable thermostatic actuating device having sufficient power capacity to overcome relatively large pressure buildups and surges and by the provision of various forms of sleeve valves which are insensitive to pressures in the cooling system. Furthermore, to minimize leakage between the component housing and main valve structure, a novel sealing means is provided and has the effect of assuring a more rapid warm-up period for the engine.

While one embodiment of the invention has been shown and described with considerable particularity, it is to be understood that the invention is not restricted thereto as the same is capable of receiving a variety of mechanical expressions, as will be apparent to those skilled in the art. It will be understood that many changes may be made in the details of construction and arrangement of parts without departing from the scope of this invention as defined in the appended claims.

I claim:

1. A temperature regulator for cooling systems having main and bypass passages comprising a cup-shaped housing having an axial opening in its end wall and an apertured side wall for communication with the bypass passage, support means including at least one strap member secured at one end to said housing adjacent said end wall and projecting through said cup-shaped housing, a support plate carried by said support means and extending across said axial opening but spaced therefrom, a main sleeve valve member having one end slidably mounted in said opening and its opposite end seated on said plate, said one end being apertured for communication with the main passage, a bypass sleeve valve member carried by said main valve member and slidably mounted in said housing for controlling flow through said apertured wall, said by-pass sleeve valve member having an opening therein for passage of by-pass fluid and through which said strap member extends, sealing means between said end wall of said housing and said one end of said main valve member for preventing leakage therebetween through said opening, a thermally responsive element carried by said plate axially of said main valve member and terminating in a movable portion adjacent said axial opening therein, means for connecting said movable portion of said thermally responsive element to said one end of said main valve member for operating the same in response to temperature changes, and yieldable means operable between said sealing means and said bypass valve member for biasing said main valve member toward said seated position while being adapted for maintaining said bypass valve member and said sealing means in operative position.

2. A temperature regulator as claimed in claim 1 wherein said main valve member is provided with a shoulder adjacent said opposite end, said bypass valve member being maintained in operative engagement with said shoulder by said bias of said yieldable means.

3. A temperature regulator as claimed in claim 2 wherein said sealing means includes a retainer member loosely mounted adjacent said one end of said main valve member, said yieldable means being operative on said retainer for biasing said sealing means into operative position.

References Cited in the file of this patent

UNITED STATES PATENTS

| 1,639,299 | Kinnard | Aug. 16, 1927 |
| 2,127,059 | Giesler | Aug. 16, 1938 |
| 2,174,042 | Rose | Sept. 26, 1939 |
| 2,457,991 | Fernstrum | Jan. 4, 1949 |
| 2,620,133 | Obermaier | Dec. 2, 1952 |
| 2,754,062 | Wangenheim | July 10, 1956 |